Feb. 2, 1971  J. V. E. HANSEN  3,559,210

COMPOSITE CERAMIC BODY ARMOR OR SHIELD

Filed May 16, 1969

INVENTOR
John V. E. Hansen

BY Cushman, Darby & Cushman
ATTORNEYS

3,559,210
COMPOSITE CERAMIC BODY ARMOR OR SHIELD
John V. E. Hansen, 11 Pinecrest Drive,
Westboro, Mass. 01581
Continuation-in-part of application Ser. No. 737,914,
June 18, 1968. This application May 16, 1969, Ser.
No. 830,187
Int. Cl. F41h 5/08
U.S. Cl. 2—2.5
10 Claims

ABSTRACT OF THE DISCLOSURE

Lightweight body armor effective to protect the wearer against close range small arms fire consists of a ceramic plate adhered to a backing element. The armor conforms generally to body shape, and while of adequate size to cover and protect a man's torso, it may yet be worn unseen and undetected under conventional garments, even street clothes. The armor of the invention, accordingly, is particularly useful among political figures, or persons guarding political figures.

This is a continuation-in-part of application Ser. No. 737,914, filed June 18, 1968, now abandoned.

BACKGROUND OF THE INVENTION

The usefulness of body armor or shields in warfare has long been recognized, and so-called bulletproof vests have been used on special occasions by law enforcement officers, political figures, guards and others. The usefulness of devices of this nature has been limited by their frequently excessive size and weight, their rigidity and interference with natural body movements.

THE DRAWING

DESCRIPTION OF THE PREFERRED EMBODIMENT

Figure 1:
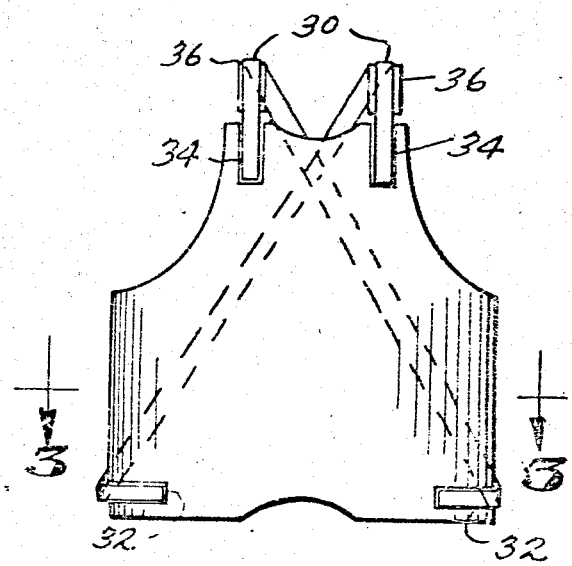
FIG. 1 is an elevational view of the front or outside of a preferred embodiment of the invention.

As shown in the drawings, an exemplary embodiment of the invention comprises an outside face plate 10 of dense ceramic material, typically a material such as high temperature fabricated polycrystalline alumina, silicon carbide or boron carbide. A preferred material is boron carbide such as that sold by the Norton Company of Worcester, Mass., U.S.A. under the trademark Noroc. The face plate 10 is secured to and mounted on a backup element 20, which may be formed of a plurality of plies of glass cloth bonded together with a suitable resin such as the standard commercial catalyzed polyester resin system. The face plate 10 and the backing element 20 may be bonded together by a suitable commercial resin adhesive, such as an epoxy resin adhesive.

Figure 3:
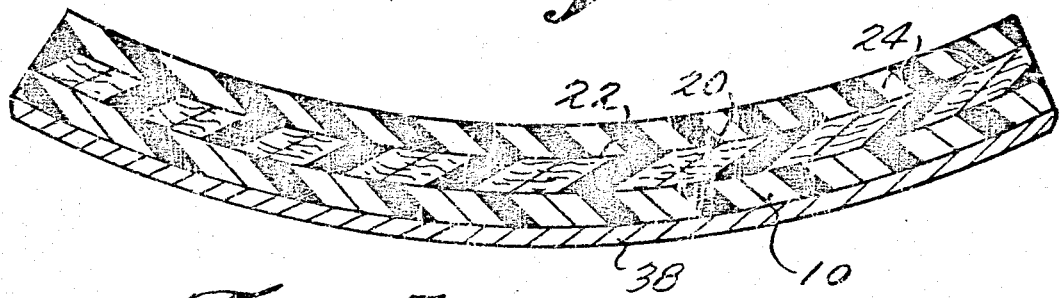
FIG. 3 is a sectional view taken on the line 3—3 of FIG. 1.
Figure 4:
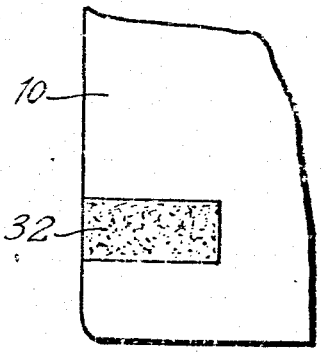
FIG. 4 is a front elevated view of a portion of the armor, slightly enlarged, showing a preferred attachment means for shoulder straps provided with the device.

The face plate and backing element laminate is formed to shape, preferably by molding, the preferred shape being slightly rounded or curved, as shown in FIG. 3, to the form of a portion of a cylindrical surface.

Figure 2:
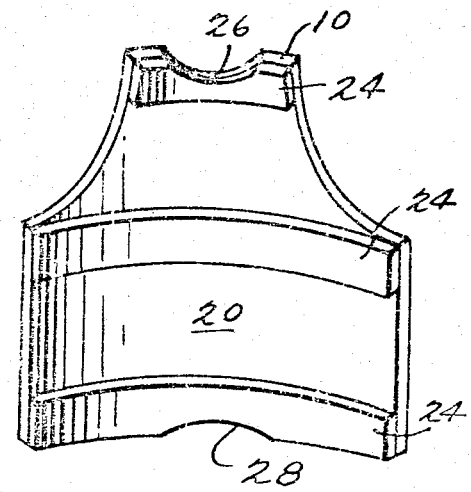
FIG. 2 is an elevational view of the rear or inside of the armor of FIG. 1.

For the purpose of illustration, the face plate 10 and backing element 20 may each be ¼ inch thick. For the comfort of the wearer, the back or inner surface 22 of the backing element 20 may be provided with a plurality of relatively wide bands 24 of cushioning material, which may be ¼ inch foamed polyvinyl chloride with an adhesive backing. Three such bands are shown in FIG. 2. The purpose of these bands is to prevent or minimize uncomfortable contact between the armor and the wearer's body. In place of the bands 24, a continuous layer coextensive in area with the backing element 20 may be provided. To accommodate the neck and chin of the wearer with a modicum of comfort, the upper edge of the shield may be notched or cut away as at 26, and for the further comfort of the wearer when seated or walking, the lower edge of the shield may be cut away as at 28.

For wearing the shield two straps 30 may be provided. Each strap is attached to the shield by means of detachable fastening means 32 mounted on the front surface of the ceramic face plate 10 at a side position near the bottom edge thereof and is adapted to extend behind the back of the wearer, as shown in dotted lines in FIG. 1, and then over the opposite shoulder of the wearer to detachable fastening means 34 mounted on the front surface of face plate 10 in front of the opposite shoulder. To effectively widen the strap 30 where it passes over the shoulder and spread its bearing surface, each strap may be encircled in this portion of its length by a pad 36.

For the detachable fastening means 32 and 34, ordinary buttons, hooks, snap fasteners, buckles and the like may be provided. To facilitate donning, doffing and adjusting the armor, however, it is preferred to provide on the end portions of the bands 24 and the outside surface portions of the face plate to which the bands are intended to be attached, cooperating strips of felt-like material, of plastic threads formed into complete loops or hooks adapted to adhere when pressed together. One form of this type of securing means is available on the market under the trademark Velcro, and is disclosed in U.S. Pat. No. 2,717,437, issued to G. De Mestrel.

The cooperating strips may be joined together merely by pressing their pile surfaces together. They are readily separated by pulling them apart, and for adjustment need merely be offset slightly relative to each other and then rejoined as before.

The foregoing arrangement of straps and detachable fastening means although preferred for its economy and simplicity is not the only way in which the armor may be attached to the wearer. The shield may be provided with, for example, a cotton twill fabric covering which has been provided with appropriately located buckles, snaps or hooks to which straps may be fastened in the arrangement described above. Buckles, hooks or the like may be attached directly to the shield proper with rivets, and the straps attached to these more permanent fastening means. This arrangement of fastening means may also be used with a somewhat different arrangement of straps, e.g., a relatively short adjustable loop of strap fastened at its ends at the top corners of the chest portion of the plate in FIG. 1 so that it fits over the head and around the neck of the wearer, with a second strap having its ends fastenable at the bottom corners of the torso portion of the plate and which passes around the waist of the wearer. If the wearer is occupied in a manner that would require frequent removal of the armor or if the wearer is to wear a garment over the armor a less permanent arrangement of fastening means and straps would be acceptable, e.g., a single loop of strap fastened at the upper corners of the chest portion of the plate, or a pair of large padded hooks may be attached to the armor and so located that they will fit over the shoulders.

If a high degree of stability on the body is required as for example in the case of an infantryman in the field, the shield may be made the front portion of a vest. The vest may be generally of conventional design having a full cloth back portion and front double walled cloth portion encasing the shield, and having at least one openable side which may be closed by hooks, buttons, buckles, or the like.

To don the armor with the preferred strap arrangement described above, it is essential merely to hold it in front of the torso, in approximately centered position. Thereafter an end of one of the straps 30 may be pressed against one of the Velcro pads 32, and the strap then passed around the back and over the opposite shoulder and the other end of the strap engaged to the Velcro pad 34. In similar fashion, the other strap 30 may be attached to Velcro pad 32 behind the back and over the opposite shoulder and then engaged to the Velcro pad 34. In such simple fashion the armor is firmly positioned. If the lower part becomes slightly out of position or loose it is necessary only to separate the strap ends from the pads 32, tighten or otherwise offset the straps and re-adhere them by contacting the cooperating strips once more. Similarly, if it be desired to readjust the location of the armor vertically it is required only to separate the straps 30 from the pads 36, tighten or otherwise adjust the straps and then re-adhere them.

The straps and fastening means, as will be evident, are not bulky, and the armor with its supporting strap may be readily worn under ordinary street clothes. That is, a man may wear the conventional shirt and necktie over the armor and the waistcoat and jacket of a conventional suit, in which circumstance it will be impossible to determine visually that the subject is wearing body armor of any type. External carriers of the type utilized with some prior art devices, also, are not required, whereby the devices are quite unobtrusive and as light as possible. A complete device, for example, may weigh less than eight pounds.

The armor described above has been found effective to stop high velocity projectiles such as caliber .30 armor-piercing projectiles fired from rifles, as well as common caliber .45 and caliber .38 bullets fired at close range from hand-held guns. While it has not been demonstrated conclusively, it is believed that the mechanics of defeating a caliber .30 high velocity armor-piercing rifle bullet which contains a hard steel core are as follows:

When the armor panel is struck on its ceramic face by a projectile of sufficiently high energy, the ceramic plate shatters and fails as does the projectile, and the energy of the projectile is delivered to the glass cloth backing and dissipated in delamination of the bonded layers of the glass cloth. The glass cloth, in effect, forms an expanding pocket which retains most of the fragments of the ceramic and bullet. The energy, of course, is ultimately transferred to the wearer's body, and may result in a serious bruise, which is easily healed and forgotten in contemplation of the alternate result involved in penetration of the shield by the bullet.

The bands or layer 24 of elastomeric foam material are provided to absorb some of the impact shock, by which the shield is forced backward against the wearer's body.

The reactions between the bullet, ceramic, and glass cloth-resin backing described above produce some fragments of the spent bullet and fragments from the shattered front convex surface of the plate 10 which will remain in front of the plate 10 and will tend to travel in a lateral direction and if uncontrolled would result in possible injury to the wearer. This possibility is eliminated by adhering to the convex side of the face plate 10, a spall shield 38 as shown in FIG. 3. The spall shield may be comprised of a layer of nylon cloth, nylon felt, foamed polymeric material such as polyethylene, polyvinyl chloride, polyurethane, rubber and the like, non-foamed relatively resilient material such as polyvinyl chloride, polyethylene, rubber, polyurethane, polypropylene, polycarbonate, and the like with or without reinforcing agents, or, laminates of the foregoing materials. Because of the desirability of keeping the overall weight of the body armor to a minimum, the thickness of the spall shield 38 should be no greater than is required to substantially stop lateral movement of those fragments of spent bullet and ceramic pieces which remain on the front convex side of the ceramic plate 10, after impact. This effective spall shield thickness will depend on the properties of the material employed, but generally a thickness of about ⅛–¼ inch is adequate. The preferred form of layer 38 is one of the foamed polymeric materials which not only contains the fragments which might otherwise cause injury, but also serves as a protective layer on the front of the armor to protect it against damage during shipment and handling. Also the foamed coating provides the armor with a softer surface characteristic which serves to disguise it in the event of contact through the wearer's clothing or in similar manner.

The foregoing description of the instant invention is for purpose of illustration only. One skilled in the art may envision further variations which are within the spirit of the invention as set forth in the appended claims.

What is claimed is:

1. A lightweight composite ceramic body armor comprising an essentially continuous contoured ceramic face plate, a backing element bonded to the back surface of said ceramic face plate, said backing element consisting essentially of a plurality of layers of glass fiber cloth, said layers being bonded together with a polyester resin and being delaminatable on impact of the body armor by a projectile, a relatively thick layer of foamed elastomeric material adhered to the back surface of said backing element, a relatively thin layer of foamed elastomeric material adhered to the front surface of said ceramic face plate, and a pair of straps detachably secured to said ceramic face plate to enclose the shoulders of the wearer, the end portions of said straps and the said ceramic plate being provided with detachable fastening means.

2. Body armor as in claim 1, wherein said detachable fastening means are matching sections of so-called hook and pile type material.

3. Body armor as in claim 1, wherein said ceramic face plate is composed of boron carbide.

4. Body armor as in claim 1, wherein said shoulder straps are provided with cushioning pads.

5. A lightweight composite ceramic body armor comprising an essentially continuous contoured ceramic face plate, a backing element bonded to the back surface of said face plate, said backing element consisting essentially of a plurality of layers of glass fiber cloth, said layers being bonded together with a polyester resin and being delaminatable on impact of the body armor by a projectile, said plate having an upper chest curving portion and a lower torso covering portion, a relatively thin layer of spall reducing material adhered to the front surface of said ceramic face plate and means adapted for attachment to hold the armor in place on a body.

6. Body armor as in claim 5 wherein said layer of spall reducing material includes a thin outer coating of a foamed elastomeric material.

7. Body armor as in claim 5 wherein said layer of spall reducing material is a laminate of nylon cloth and a coating of a foamed elastomeric material.

8. A lightweight composite ceramic body armor comprising an essentially continuous contoured ceramic face plate, a backing element bonded to the back surface of said ceramic face plate, said backing element consisting essentially of a plurality of layers of glass fiber cloth, said layers being bonded together with a polyester resin and being delaminatable on impact of the body armor by a projectile, a cushioning or shock absorbing material secured to the back surface of said ceramic face plate, a relatively thin layer of spall reducing material covering the front surface of said ceramic face plate and means for attachment to hold the armor in place on a body.

9. Body armor as in claim 8 wherein said means for attachment are secured to one surface of said face plate.

10. Body armor as in claim 8 wherein said means for attachment are secured to the front surface of said face plate.

References Cited

UNITED STATES PATENTS

| | | | |
|---|---|---|---|
| 2,640,987 | 6/1953 | Ehlers | 2—2.5 |
| 2,717,437 | 9/1955 | De Mestral. | |
| 3,292,181 | 12/1966 | Kennedy et al. | 2—2.5 |
| 3,444,033 | 5/1969 | King | 161—404X |
| 3,452,362 | 7/1969 | Korolick et al. | 2—2.5 |

FOREIGN PATENTS 17,733  12/1915  Great Britain.

JORDAN FRANKLIN, Primary Examiner

G. H. KRIZMANICH, Assistant Examiner

U.S. Cl. X.R.

161—404